United States Patent
Ohhama et al.

(10) Patent No.: US 9,216,775 B2
(45) Date of Patent: Dec. 22, 2015

(54) SUBFRAME FOR VEHICLE

(71) Applicant: HONDA MOTOR CO., LTD., Minato-ku, Tokyo (JP)

(72) Inventors: Shosuke Ohhama, Wako (JP); Tetsuya Miyahara, Wako (JP); Tsunehisa Hata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/417,187

(22) PCT Filed: Jul. 2, 2013

(86) PCT No.: PCT/JP2013/068114
§ 371 (c)(1),
(2) Date: Jan. 26, 2015

(87) PCT Pub. No.: WO2014/017260
PCT Pub. Date: Jan. 30, 2014

(65) Prior Publication Data
US 2015/0166104 A1 Jun. 18, 2015

(30) Foreign Application Priority Data

Jul. 27, 2012 (JP) ................. 2012-167616

(51) Int. Cl.
| | | |
|---|---|---|
| B62D 21/00 | (2006.01) | |
| B62D 29/00 | (2006.01) | |
| B62D 21/11 | (2006.01) | |
| B62D 21/02 | (2006.01) | |

(52) U.S. Cl.
CPC .............. B62D 29/008 (2013.01); B62D 21/02 (2013.01); B62D 21/11 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,280,957 A | * | 1/1994 | Hentschel | ................ B60G 3/20 280/124.109 |
| 5,496,067 A | * | 3/1996 | Stoll | ..................... B62D 21/07 280/781 |
| 5,660,428 A | * | 8/1997 | Catlin | .................... B62D 21/04 269/311 |
| 6,679,545 B1 | * | 1/2004 | Balzer | ................. B62D 25/084 180/68.4 |
| 6,929,272 B2 | * | 8/2005 | Matsumoto | ........... B62D 21/11 280/124.109 |
| 7,152,896 B2 | * | 12/2006 | Roeth | .................. B62D 29/008 296/203.01 |
| 7,520,514 B2 | * | 4/2009 | Ogawa | ..................... B60G 3/20 180/312 |
| 7,584,815 B2 | * | 9/2009 | Ogawa | ..................... B60G 3/20 180/312 |

(Continued)

FOREIGN PATENT DOCUMENTS

| | | | | |
|---|---|---|---|---|
| DE | 102004055406 A1 | * | 1/2006 | ............. B62D 21/02 |
| DE | 102009051033 A1 | * | 5/2011 | ........... B62D 27/023 |

(Continued)

*Primary Examiner* — Nicole Verley
(74) *Attorney, Agent, or Firm* — Carrier Blackman & Associates, P.C.; Joseph P. Carrier; William D. Blackman

(57) ABSTRACT

Disclosed is a subframe for a vehicle that allows a molten metal to be smoothly guided in order to maintain a good flow. This subframe for a vehicle is equipped with a rear subframe. For the rear subframe, a rear cross member, a rear section of a left side member, and a rear upper section of a right side member are constructed with an aluminum alloy and formed into one piece that has a substantially U-shape in a plan view. The rear cross member has a radial rib group that extends radially and a parallel rib group that intersects with the radial rib group. The radial rib group is configured such that radial ribs positioned further outside in the vehicle width direction form larger tilt angles.

7 Claims, 11 Drawing Sheets

(56) References Cited

U.S. PATENT DOCUMENTS

| | | | |
|---|---|---|---|
| 7,771,137 B2 * | 8/2010 | Anzai | B62D 21/11 180/232 |
| 8,740,231 B2 * | 6/2014 | Shibaya | B62D 21/11 280/124.109 |
| 9,108,676 B2 * | 8/2015 | Leibl | B62D 21/11 |
| 2001/0022437 A1 * | 9/2001 | Suzuki | B60G 7/02 280/124.134 |
| 2006/0278463 A1 | 12/2006 | Anzai et al. | |
| 2006/0284449 A1 * | 12/2006 | Miyahara | B62D 21/11 296/204 |
| 2015/0266511 A1 * | 9/2015 | Uicker | B23K 20/129 280/124.109 |

FOREIGN PATENT DOCUMENTS

| | | | | |
|---|---|---|---|---|
| DE | WO 2014063687 A2 * | 5/2014 | | B62D 21/02 |
| JP | 2005-014737 A | 1/2005 | | |
| JP | 2005-059813 A | 3/2005 | | |
| JP | 2007-002857 A | 1/2007 | | |
| JP | 2009-126207 A | 6/2009 | | |
| JP | 2010-069965 A | 4/2010 | | |
| JP | 2012-136195 A | 7/2012 | | |

* cited by examiner

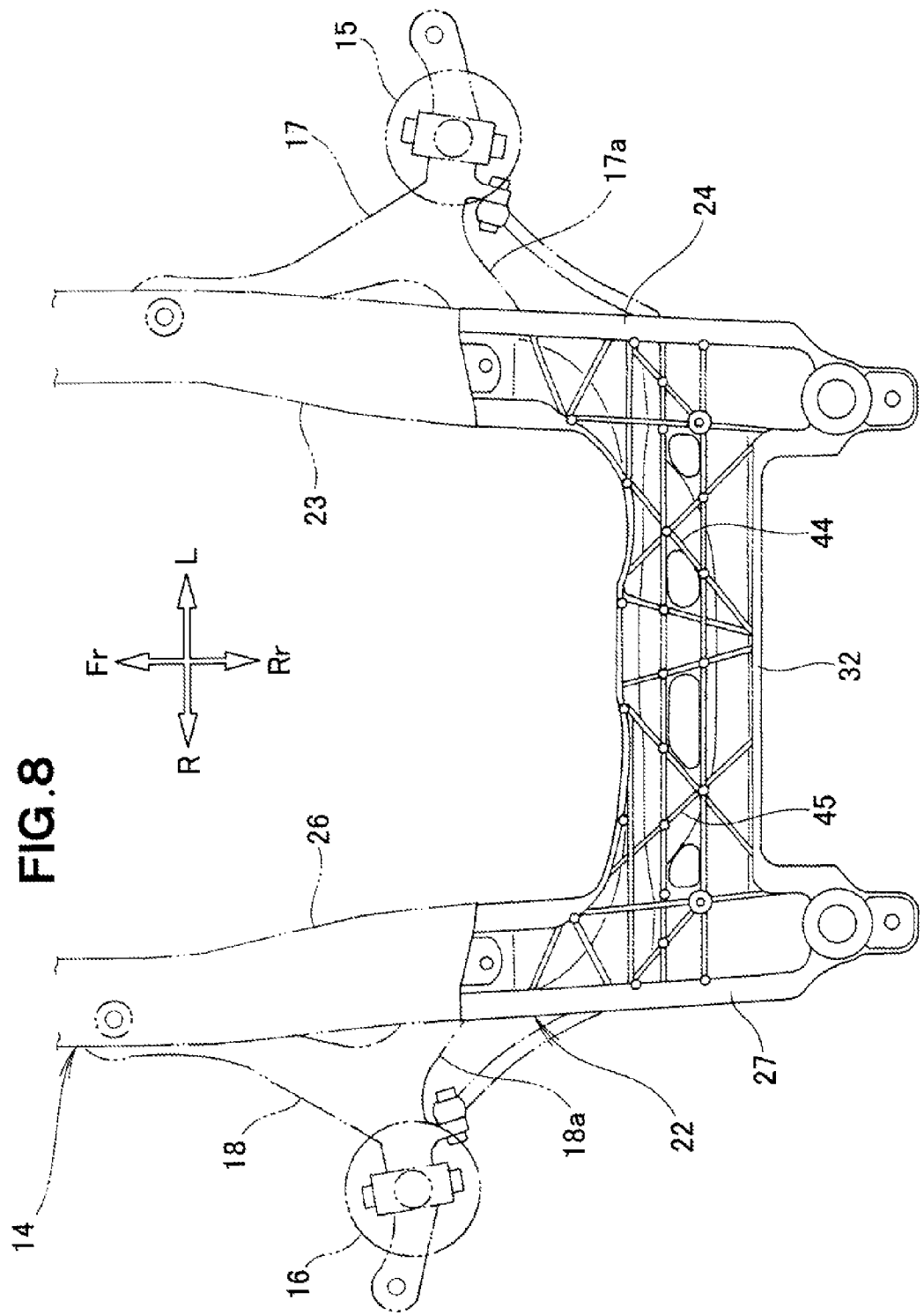

SUBFRAME FOR VEHICLE

TECHNICAL FIELD

The present invention relates to a subframe for a vehicle, which is composed partly or wholly of a cast member.

BACKGROUND ART

Generally, vehicles include a subframe below left and right front side skeleton members, and a power source and left and right front suspensions are supported by the subframe. As such a subframe, a subframe is disclosed which is formed (by casting) of aluminum alloy to attain weight reduction of the vehicle. For example, in Patent Literature 1, the subframe formed of aluminum alloy has a plurality of reinforcing ribs formed on an inner surface thereof in a saw-toothed shape as a whole to thereby securing strength and rigidity.

For casting the subframe using a mold, spaces or cavities for forming the reinforcing ribs are formed inside the mold. The cavities for the reinforcing ribs are used as guide passages of molten metal. By using the cavities for the reinforcing ribs as the guide passages, molten metal of aluminum alloy can be guided through all the regions of the subframe.

In Patent Literature 1, however, since the reinforcing ribs are formed in the saw-toothed shape, the cavities for the reinforcing ribs, which are formed inside the mold, have a saw-toothed shape. Therefore, when casting the subframe, it is difficult to guide smoothly the molten metal of aluminum alloy along the cavities for the reinforcing ribs, so that it is difficult to maintain a good flow.

PRIOR ART LITERATURE

Patent Literature

Patent Literature 1: Japanese Patent Application Laid-Open Publication No. 2005-59813

SUMMARY OF INVENTION

Technical Problems

It is therefore an object of the present invention to provide a vehicle subframe which is capable of smoothly guiding molten metal and maintaining a good flow.

Solutions to Problems

According to the invention as defined in claim 1, there is provided a vehicle subframe configured to support left and right suspensions, the vehicle subframe including a left side member disposed on a left side of a vehicle and extending in a longitudinal direction of the vehicle, a right side member disposed on a right side of the vehicle and extending in the longitudinal direction of the vehicle, and a cross member connecting the left and right side members, wherein the cross member, a rear section of the left side member and a rear section of the right side member are integrally formed of aluminum alloy to have a substantially U-shape in a plan view, wherein the cross member has: a plurality of radial ribs extending radially from a rear end of a central part of the cross member in the vehicle width direction to a front end thereof to tilt outward in the vehicle width direction; and a plurality of parallel ribs intersecting with the radial ribs and extending parallel to the cross member, and wherein the radial ribs being arranged in such a manner that radial ribs positioned further outward in the vehicle width direction away from the central part of the cross member form larger tilt angles.

Preferably, as defined in claim 2, the radial ribs include left and right radial ribs positioned outward in the vehicle width direction and extending toward the left and right suspensions, respectively.

Preferably, as defined in claim 3, the radial ribs have a rib height smaller than that of the parallel ribs.

Preferably, as defined in claim 4, in a state where the vehicle subframe is mounted on the vehicle, the cross member includes a cross-member upper section extending between the rear section of the left side member and the rear section of the right side member to form an upwardly curved shape with a central part thereof in the vehicle width direction raised upward, and having the radial ribs and the parallel ribs formed on an underside thereof, and wherein the cross-member upper section has a cross-member recess extending in the vehicle width direction and recessed toward the underside so that a lowest part thereof forms a part of the central part.

Advantageous Effects of Invention

In the invention as defined in claim 1, the cross member, the rear section of the left side member, and the rear section of the right side member are integrally formed of aluminum alloy to have the substantially U-shape in a plan view. Further, the cross member has the radial ribs arranged in such a manner that the radial ribs positioned further outward in the vehicle width direction away from the central part of the cross member form larger tilt angles. The radial ribs can thus be formed to extend radially forward from the rear section of the left side member. In addition, the cross member has the parallel ribs each of which intersects with the radial ribs.

When a casting mold is clumped, spaces for forming the radial ribs (radial cavities) and spaces for forming the parallel ribs (parallel cavities) are formed inside the mold. The radial cavities are formed to extend radially forward from the rear section of the left side member. The parallel cavities are formed to intersect with the radial cavities. The radial cavities and the parallel cavities formed in this manner can be used as guide passages of molten metal.

With this configuration, molten metal poured from a rear end of the radial cavities (i.e., part corresponding to the rear end of the central part of the cross member in the vehicle width direction) can be smoothly guided through the radial cavities and the parallel cavities, thereby maintaining a good flow. By thus maintaining the good flow of molten metal, the molten metal can be suitably guided through all the regions corresponding to the cross member, the rear section of the left side member, and the rear section of the right side member (i.e., a cast member).

In the invention as defined in claim 2, among the radial ribs, the left and right radial ribs positioned outward in the vehicle width direction extend respectively toward the left and right suspensions. Thus, loads applied from the left and right suspensions to the cross member can be supported by the left and right radial ribs positioned outward in the vehicle width direction. In this manner, rigidity against the loads applied from the left and right suspensions can be increased.

In the invention as defined in claim 3, the rib height of the radial ribs is set to be smaller than that of the parallel ribs. Therefore, the parallel cavities can be formed larger than the radial cavities, which allow the molten metal guided by the radial cavities to flow smoothly into the parallel cavities. The molten metal guided to the parallel cavities further flows smoothly outward in the vehicle width direction, thereby maintaining a good flow. As a result, the molten metal can be suitably guided through all the regions corresponding to the cross member, the rear section of the left side member, and the rear section of the right side member (of the cast member).

In the invention as defined in claim 4, in the state where the vehicle subframe is mounted on the vehicle, the cross-member upper section of the cross member is formed in the upwardly curved shape. The cross-member upper section has the cross-member recess recessed toward the underside of the cross-member upper section so that the lowest part thereof forms the part of the central part in the vehicle width direction of the cross-member upper section. Further, the cross-member upper section has the radial ribs and the parallel ribs formed on the underside thereof. With this configuration, the rib heights of the radial ribs and the parallel ribs at the central part of the cross member can be made smaller.

When the mold is clumped, a space for forming the cross-member recess (recess cavity) is formed to be in communication with the radial cavities and the parallel cavities. The cavity heights of the radial cavities and the parallel cavities communicating with the recess cavity can be made smaller. The molten metal guided by the radial cavities and the parallel cavities flows smoothly into the recess cavity, thereby maintaining the good flow. As a result, the molten metal can be suitably guided through all the regions corresponding to the cross member, the rear section of the left side member, and the rear section of the right side member (of the cast member).

BRIEF DESCRIPTION OF DRAWINGS

FIG. 8 is a bottom view showing a relationship between left and right outer radial ribs and left and right front suspensions;

DESCRIPTION OF EMBODIMENTS

Figure 1:
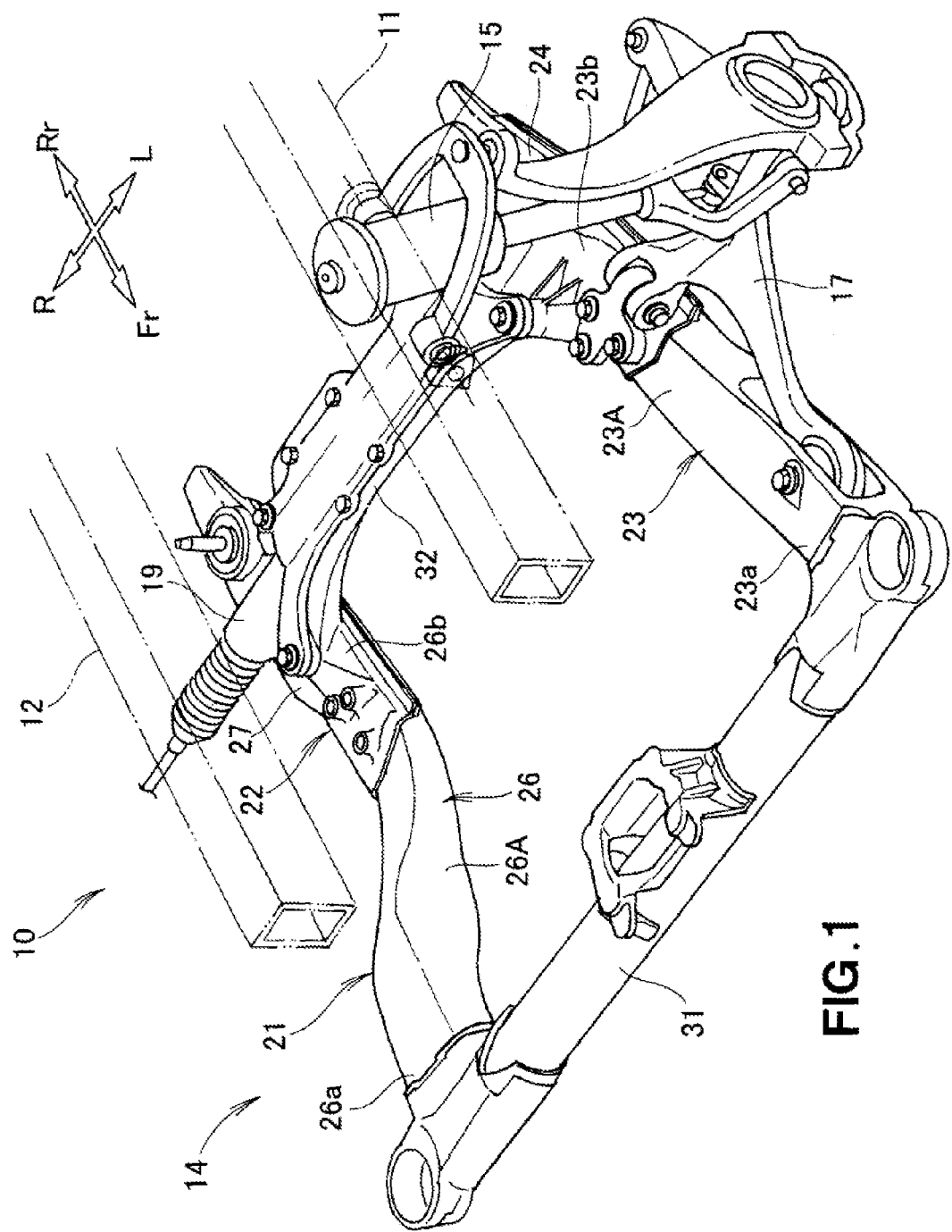
FIG. 1 is a perspective view showing a vehicle equipped with a vehicle subframe according to the present invention.

A certain preferred embodiment of the present invention will be described in detail below with reference to the accompanying drawings. In the drawings and following description, the terms "front (Fr)", "rear (Rr)", "left (L)", "right (R)". "upper (Up)" and "lower (Lo)" are used to refer to directions as viewed from a human operator or driver in a vehicle.

Embodiment

As shown in FIG. 1, a vehicle 10 includes left and right front side frames (skeleton members) 11, 12 disposed respectively on left and right sides of the vehicle 10 and extending in a longitudinal direction of the vehicle, a subframe (vehicle subframe) 14 disposed below the left and right front side frames 11, 12, a power source (not shown) and left and right front suspensions (suspensions) 15, 16 (right front suspension 16 is shown in FIG. 8) supported by the subframe 14, and a steering gear box 19 mounted on and above the subframe 14.

The left front suspension 15 is supported by a left side member 23 of the subframe 14 via a left lower arm 17. The right front suspension 16 is supported by a right side member 26 of the subframe 14 via a right lower arm 18.

The subframe 14 is composed of a front subframe 21 and a rear subframe 22, which are joined with each other to form a rectangular shape. The front subframe 21 includes a main body 23A of a left side member 23 disposed on the left side of the vehicle 10 and extending in the longitudinal direction of the vehicle, a main body 26A of a right side member 26 disposed on the right side of the vehicle 10 and extending in the longitudinal direction of the vehicle, and a front cross member 31 connecting front ends 23a, 26a of the left and right side members 23, 26.

The front subframe 21 is a steel member having a substantially U-shape in a plan view composed of the main body 23A of the left side member 23, the main body 26A of the right side member 26, and the front cross member 31. The rear subframe 22 includes a rear cross member 32, a rear upper section (rear section) 24 of the left side member 23, and a rear upper section (rear section) 27 of the right side member 26.

Figure 2:
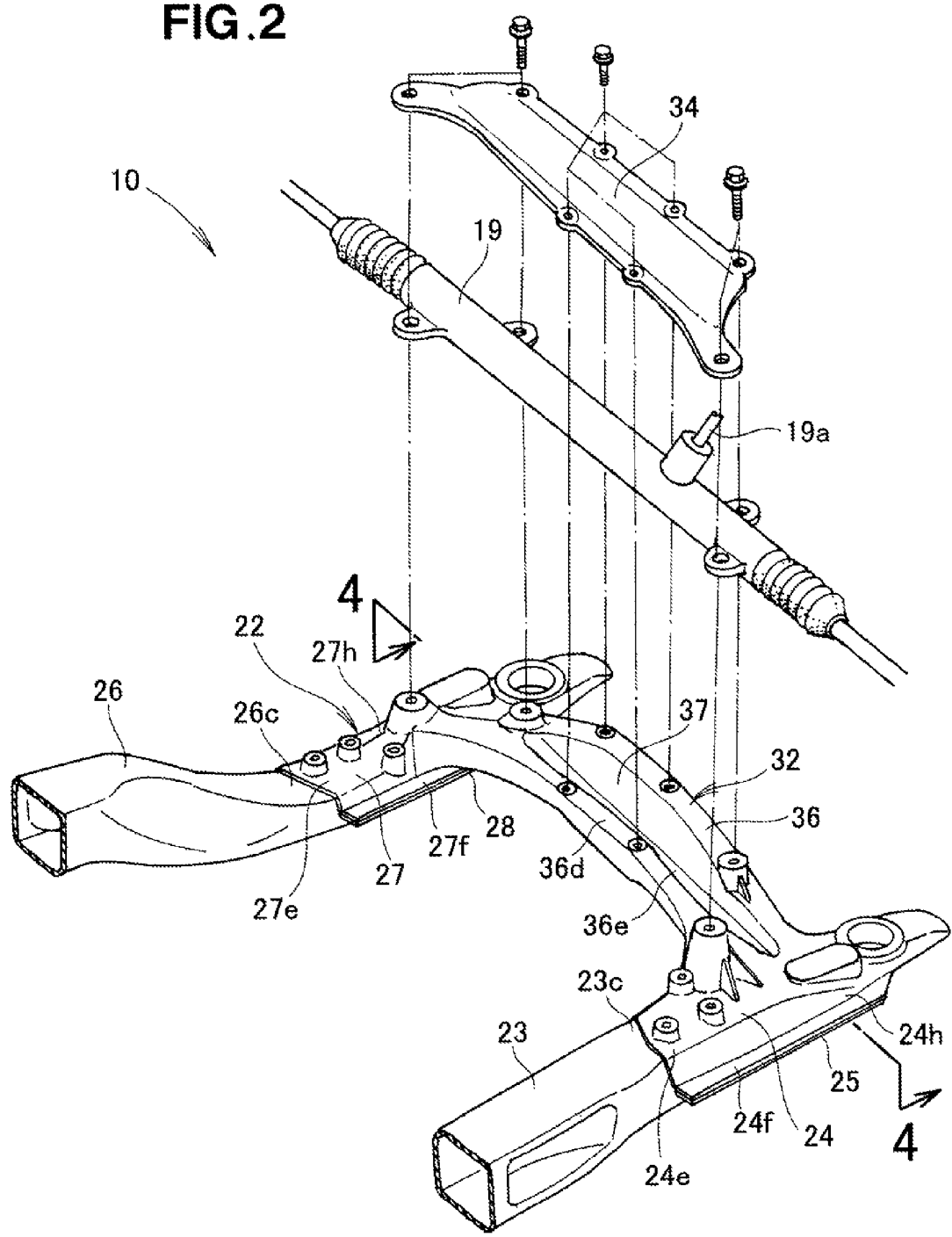
FIG. 2 is an exploded perspective view of the vehicle subframe of FIG. 1 with a steering gear box detached.
Figure 3:
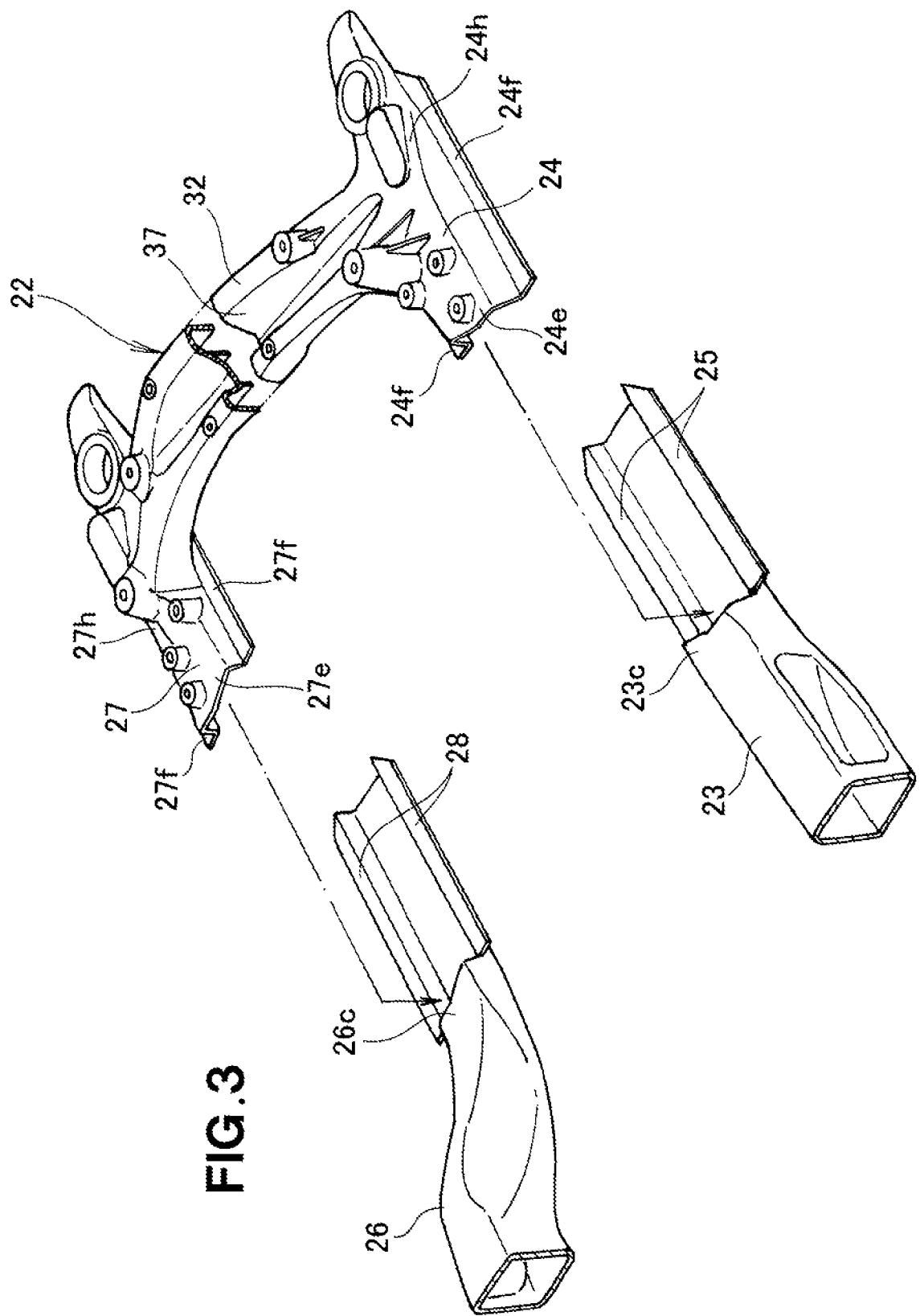
FIG. 3 is an exploded perspective view of the vehicle subframe of FIG. 2 with a rear subframe detached.

As shown in FIGS. 2 and 3, the rear subframe 22 is a cast member having a substantially U-shape in a plan view composed of the rear cross member 32, the rear upper section 24 of the left side member 23, and the rear upper section 27 of the right side member 26 which are integrally formed by low pressure casting of aluminum alloy. The rear upper section 24 of the left side member 23 will be hereinafter referred to as "left side rear upper section 24". Also, the rear upper section 27 of the right side member 26 will be hereinafter referred to as "right side rear upper section 27". Since the left side rear upper section 24 and the right side rear upper section 27 are bilaterally symmetrical with each other, the same reference characters are used for the shared elements of the left and right side upper sections 24, 27, and a detailed description will be omitted.

Figure 4:
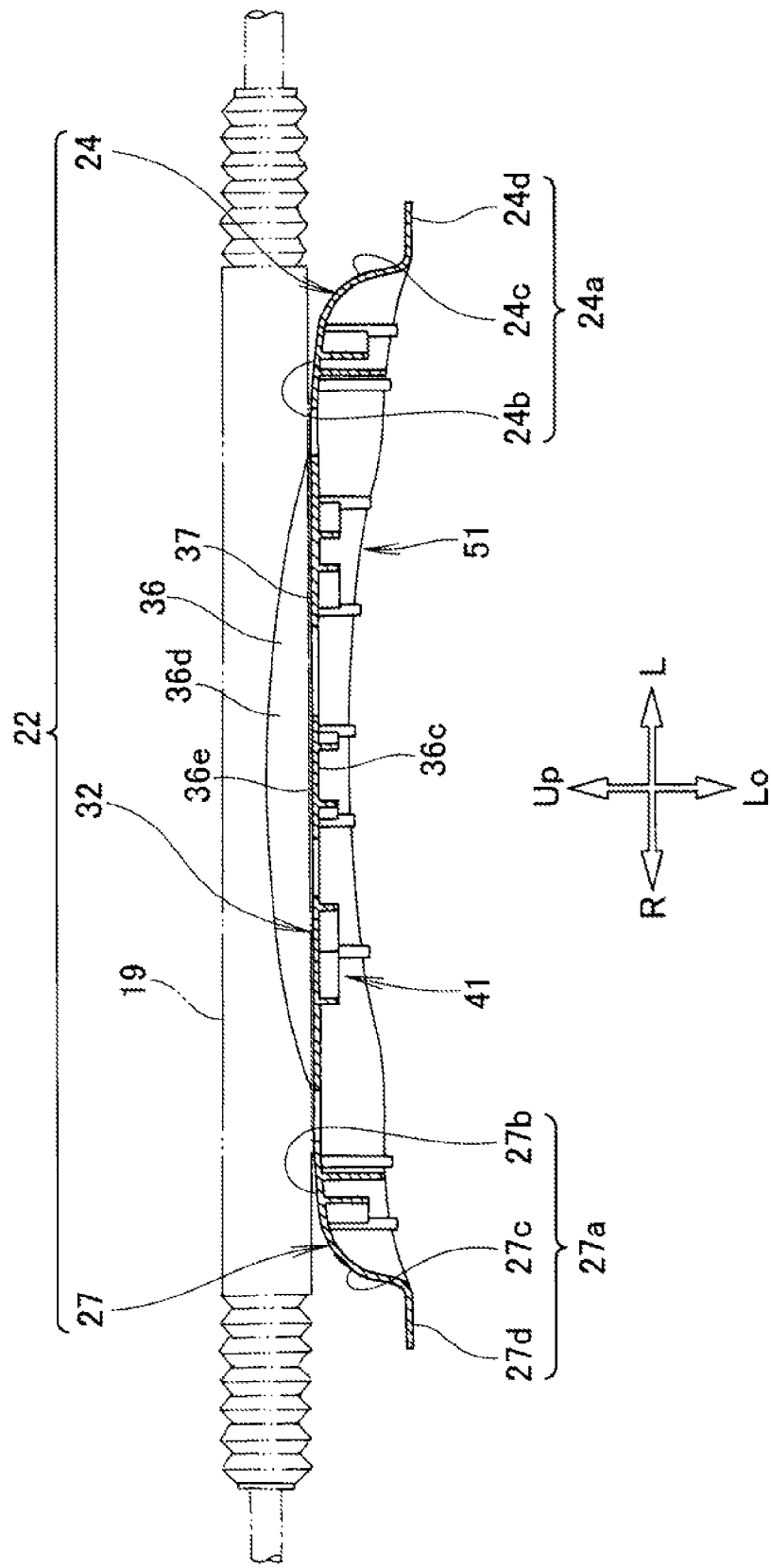
FIG. 4 is a cross-sectional view taken along line 4-4 of FIG. 2.

As shown in FIG. 4, the rear subframe 22 has a substantially hat-shaped cross section formed by the rear cross member 32, the left side rear upper section 24, and the right side rear upper section 27. More specifically, the left side rear upper section 24 has a top part 24b, an outer wall part 24c, and an outer flange 24d which together form a left side outer peripheral part 24a. Also, the right side rear upper section 27 has a top part 27b, an outer wall part 27c, and an outer flange 27d which together form a right side outer peripheral part 27a. Thus, the rear subframe 22 is formed in the substantially hat-shaped cross section by a cross-member upper section 36 (cross-member recess 37) of the rear cross member 32, the left side outer peripheral part 24a, and the right side outer peripheral part 27a. The steering gear box 19 is housed in the cross-member recess 37 of the cross-member upper section 36.

As shown in FIGS. 2 and 3, the left side rear upper section 24 has a front end 24e joined to a central part 23c of the left side member 23, and a lower end 24f joined to a rear lower section 25 of the left side member 23. Further, the left side rear upper section 24 has a left reinforcing rib group 57 (FIG. 6) formed on an underside 24i thereof. The right side rear upper section 27 has a front end 27e joined to a central part 26c of the right side member 26, and a lower end 27f joined to a rear lower section 28 of the right side member 26. Further, the right side rear upper section 27 has a right reinforcing rib group 67 (FIG. 6) formed on an underside 27*i* thereof.

The rear cross member 32 extends between a central part 24*h* of the left side rear upper section 24 and a central part 27*h* of the right side rear upper section 27. The steering gear box 19 is housed in the cross-member recess 37 of the rear cross member 32 to extend in the vehicle width direction, and covered by a cover 34. In this state, the steering gear box 19 and the cover 34 are fixed to the rear cross member 32.

The steering gear box 19 is a cylindrical case for housing a steering gear (not shown). A steering wheel is mounted on a steering shaft 19*a* extending from the steering gear box 19. The vehicle 10 can be changed by operating the steering wheel. The traveling direction of the vehicle 10 can be changed by operating the steering wheel.

Figure 5:
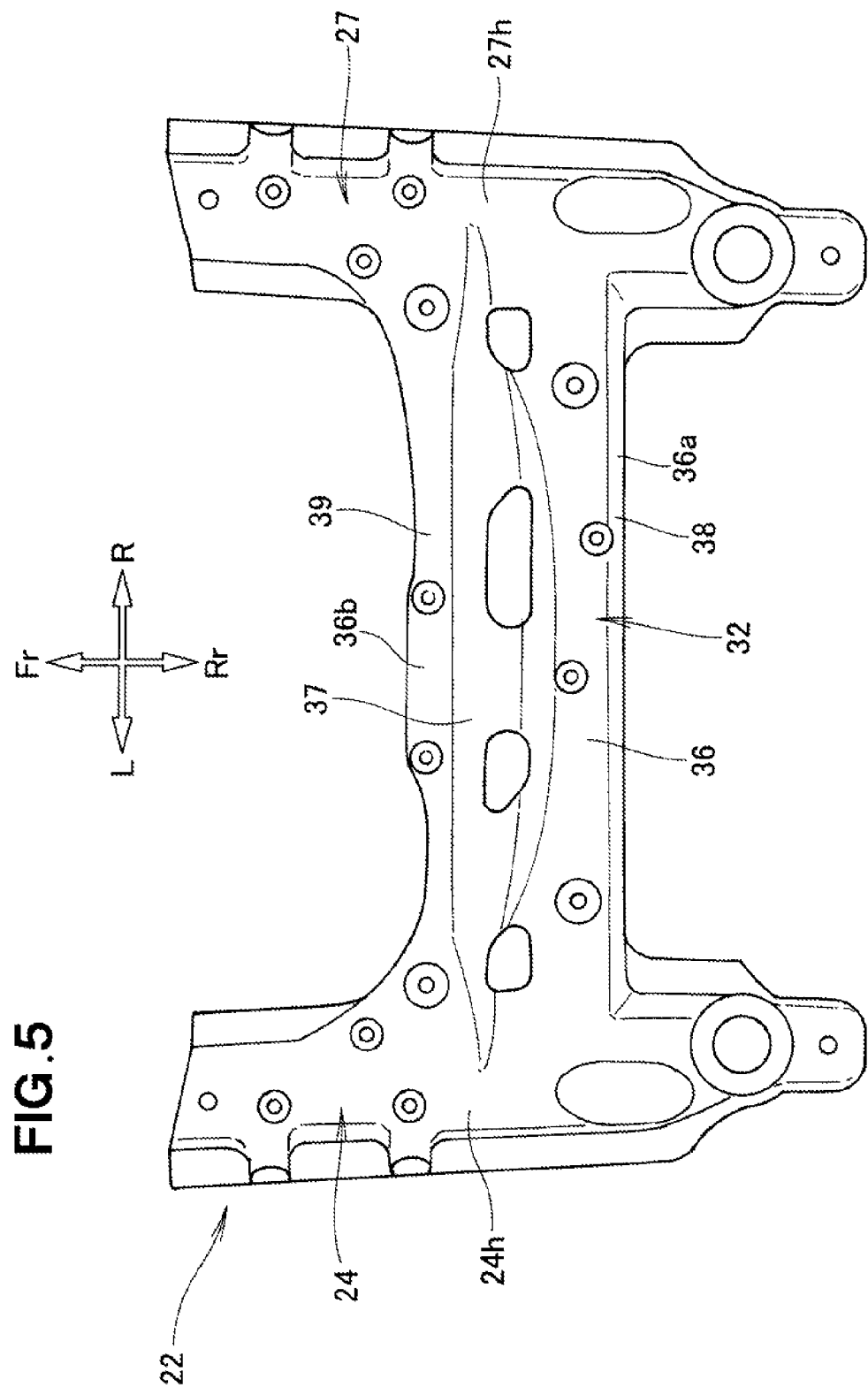
FIG. 5 is a plan view of the rear subframe of FIG. 3.
Figure 6:
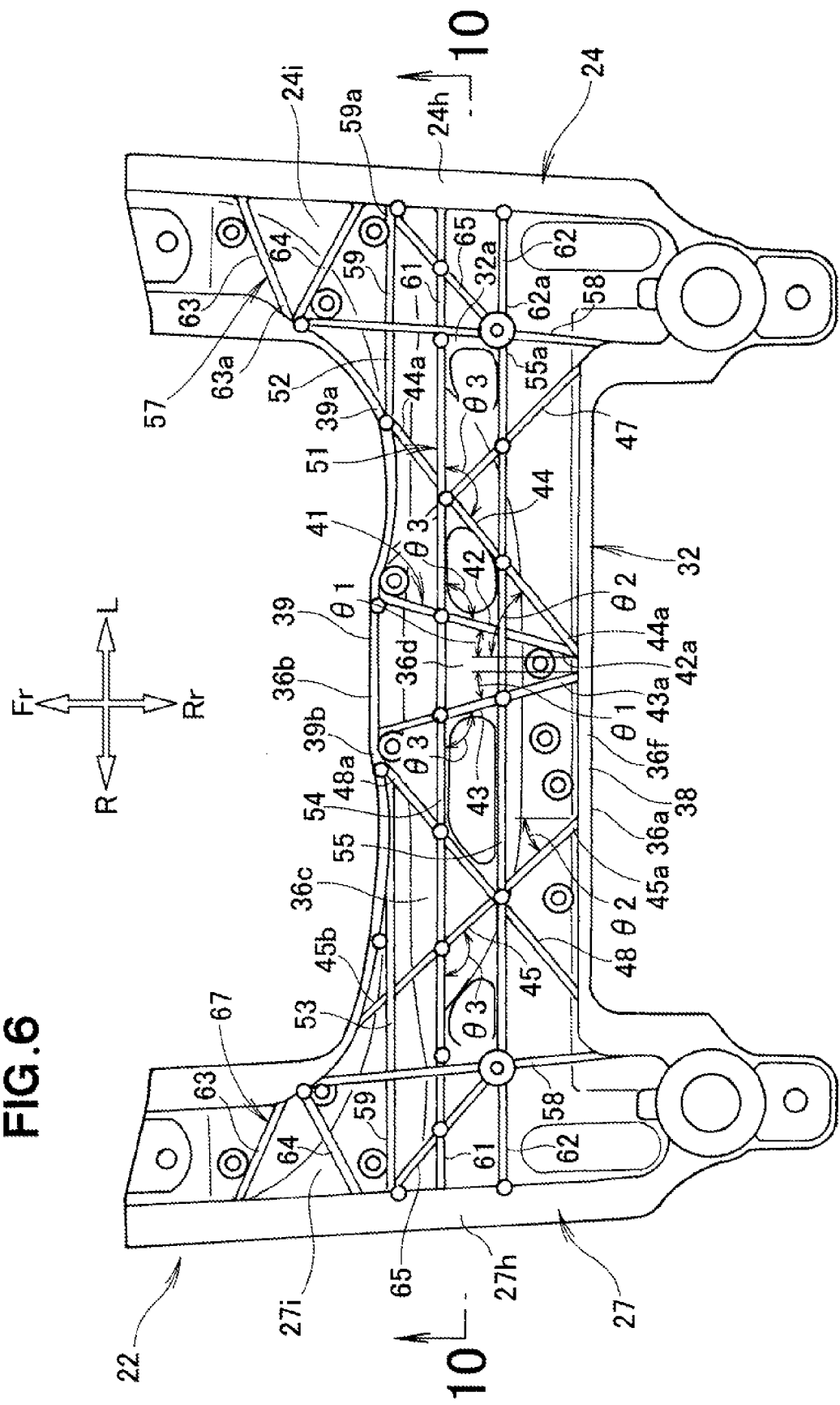
FIG. 6 is a bottom view of the rear subframe of FIG. 3.

As shown in FIGS. 5 and 6, the rear cross member 32 includes the cross-member upper section 36 extending between the central part 24*h* of the left side rear upper section 24 and the central part 27*h* of the right side rear upper section 27, a rear wall 38 (see also FIGS. 9A-9B) formed at a rear end 36*a* of the cross-member upper section 36, and a front wall 39 (see also FIGS. 9A-9B) formed at a front end 36*b* of the cross-member upper section 36.

Further the rear cross member 32 has a radial rib group 41 and left and right tilted ribs 47, 48 formed on an underside 36*c* of the cross-member upper section 36, and a parallel rib group 51 formed on the underside 36*c* of the cross-member upper section 36. In addition, the left reinforcing rib group 57 is formed on the underside 24*i* of the left side rear upper section 24, the right reinforcing rib group 67 is formed on the underside 27*i* of the right side rear upper section 27.

The cross-member upper section 36 is formed in a substantially rectangular shape in a plan view, and has the cross-member recess 37 (see also FIGS. 9A-9B) extending in the vehicle width direction through a center of the cross-member upper section 36 in the longitudinal direction of the vehicle. As shown in FIG. 2, in a state where the subframe 14 is mounted on the vehicle 10, the cross-member upper section 36 is formed in an upwardly curved shape with a central part 36*d* thereof in the vehicle width direction raised upward. The cross-member recess 37 is recessed toward the underside 36*c* of the cross-member upper section 36 so that a lowest part thereof forms a part 36*e* (see also FIG. 4) of the central part 36*d* of the cross-member upper section 36.

Figure 7:
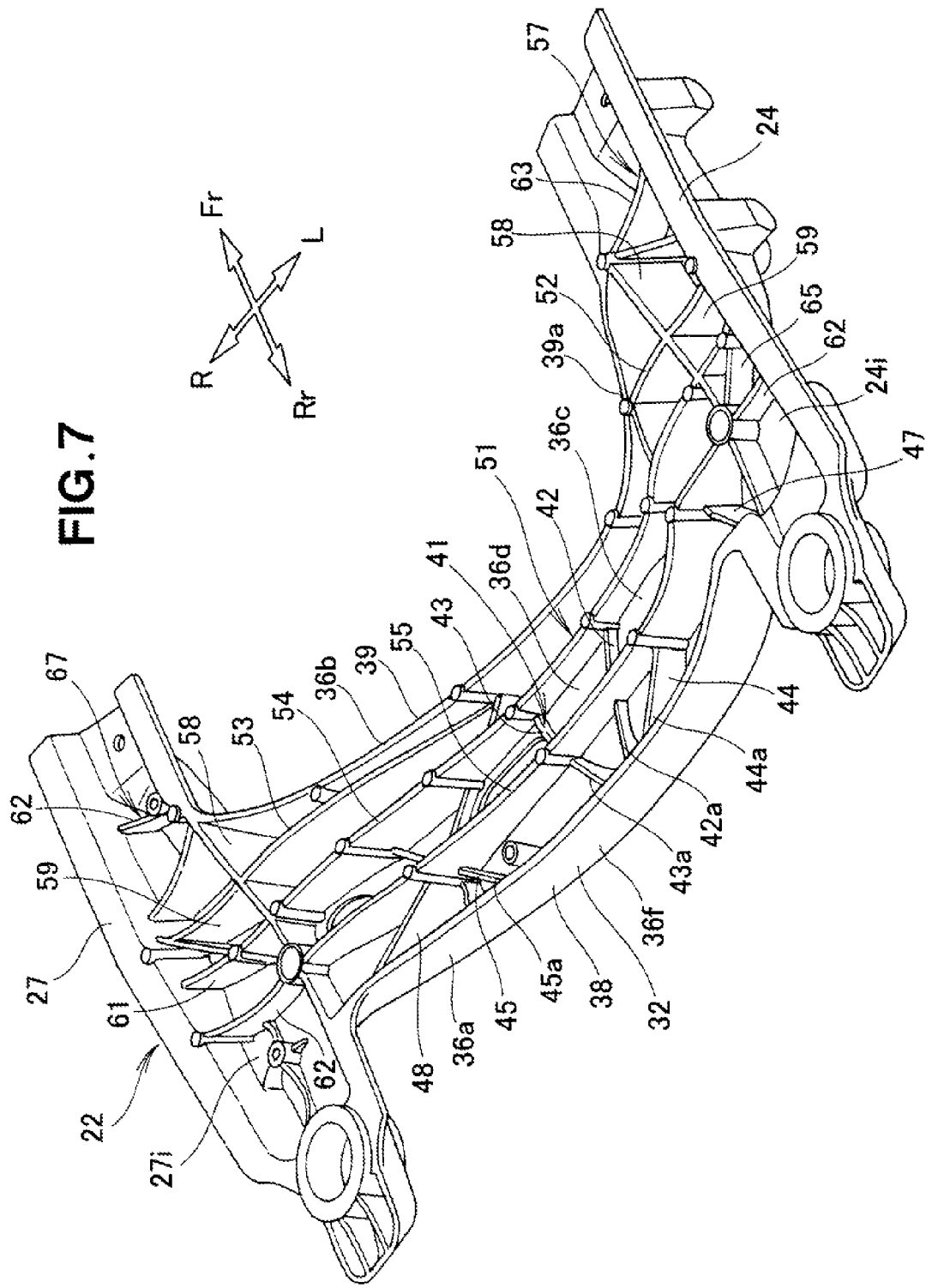
FIG. 7 is a perspective view of the rear subframe of FIG. 3 as viewed from below.

As shown in FIGS. 6 and 7, the radial rib group 41 includes a plurality of radial ribs extending radially from a rear end (hereinafter referred to as "central rear end") 36*f* of the central part 36*d* of the cross-member upper section 36 to a front end 36*b* thereof to tilt outward in the vehicle width direction. More specifically, the radial rib group 41 includes, as the radial ribs, a left inner radial rib 42, a right inner radial rib 43, a left outer radial rib 44, and a right outer radial rib 45.

The left inner radial rib 42 extends radially from the rear wall 38 (rear end of the rear cross member 32) to the front wall 39 (front end of the rear cross member 32) to be tilted leftward (outward in the vehicle width direction) by a tilt angle θ1. The right inner radial rib 43 extends radially from the rear wall 38 to the front wall 39 to be tilted rightward (outward in the vehicle width direction) by the tilt angle θ1.

The left outer radial rib 44 is positioned leftward (outward in the vehicle width direction) relative to the left inner radial rib 42. The left outer radial rib 44 extends radially from the rear wall 38 to the front wall 39 to be tilted leftward by a tilt angle θ2. The right outer radial rib 45 is positioned rightward (outward in the vehicle width direction) relative to the right inner radial rib 43. The right outer radial rib 45 extends radially from the rear wall 38 to the front wall 39 to be tilted rightward by the tilt angle θ2.

The tilt angle θ2 of the left and right outer radial ribs 44, 45 is set to be larger than the tilt angle θ1 of the left and right inner radial ribs 42, 43. Namely, the radial rib group 41 is configured so that the radial ribs positioned further outward in the vehicle width direction away from the central part 36*d* of the rear cross member 32 (more specifically, the cross-member upper section 36) form larger tilt angles.

The radial ribs 42 to 45 of the radial rib group 41 have rear ends 42*a* to 45*a* located at the central rear end 36*f* of the cross-member upper section 36. The central rear end 36*f* of the cross-member upper section 36 corresponds to a part facing a gate of a casting mold when the rear subframe 22 is formed by low pressure casting. With this configuration, when the rear subframe 22 is formed by low pressure casting, molten metal of aluminum alloy poured from the gate of the mold is guided to the part corresponding to the rear ends 42*a* to 45*a* of the radial rib group 41 (radial ribs 42 to 45).

As shown in FIG. 8, the left outer radial rib 44 extends toward a rear arm 17*a* of the left lower arm 17. The left lower arm 17 is a member that supports the left front suspension 15. Thus, a load applied from the left front suspension 15 to the rear cross member 32 via the rear arm 17*a* can be suitably supported by the left outer radial rib 44.

Also, the right outer radial rib 45 extends toward a rear arm 18*a* of the right lower arm 18. The right lower arm 18 is a member that supports the right front suspension 16. Thus, a load applied from the right front suspension 16 to the rear cross member 32 via the rear arm 18*a* can be suitably supported by the right outer radial rib 45.

In this manner, the loads applied from the left and right front suspensions 15, 16 to the rear cross member 32 can be supported by the left and right outer radial ribs 44, 45. As a result, the rear cross member 32 (rear subframe 22) can have increased strength and rigidity against the loads applied from the left and right front suspensions 15, 16.

As shown in FIGS. 6 and 7, the left and right tilted ribs 47, 48 are formed on the underside 36*c* of the cross-member upper section 36. The left tilted rib 47 is tilted to intersect with the left outer radial rib 44. The right tilted rib 48 is tilted to intersect with the right outer radial rib 45. With this configuration, the rear cross member 32 (rear subframe 22) can have further increased rigidity.

The parallel rib group 51 includes a plurality of parallel ribs intersecting with the radial ribs 42 to 45 and extending parallel to the rear cross member 32. More specifically, the parallel rib group 51 includes, as the parallel ribs, a front left parallel rib 52, a front right parallel rib 53, a middle parallel rib 54, and a rear parallel rib 55. The front left parallel rib 52 and the front right parallel rib 53 are positioned on the same straight line extending in the vehicle width direction. Intersection angles θ3 between the radial ribs 42 to 45 and the parallel ribs 52 to 55 are set to be obtuse angles.

The front left parallel rib 52 extends leftward from a left curved part 39*a* of the front wall 39 (more specifically, a front end 44*a* of the left outer radial rib 44) to the left reinforcing rib group 57. The front right parallel rib 53 extends rightward from a central part 39*b* of the front wall 39 (more specifically, a front end 48*a* of the right tilted rib 48) to the right reinforcing rib group 67, and intersects with a front end 45*b* of the right outer radial rib 45.

The middle parallel rib 54 is positioned rearward of the front left parallel rib 52 and the front right parallel rib 53 with a predetermined distance. The middle parallel rib 54 extends in the vehicle width direction along the front wall 39 and the rear wall 38, between the left reinforcing rib group 57 and the right reinforcing rib group 67. The middle parallel rib 54 intersects with the radial rib group 41 (i.e., the left and right inner radial ribs 42, 43 and the left and right outer radial ribs 44, 45), and the left and right tilted ribs 47, 48.

The rear parallel rib 55 is positioned between the middle parallel rib 54 and the rear wall 38. The rear parallel rib 55 extends in the vehicle width direction along the front wall 39 and the rear wall 38, between the left reinforcing rib group 57 and the right reinforcing rib group 67. The roar parallel rib 55 intersects with the radial rib group 41 (i.e., the left and right inner radial ribs 42, 43 and the left and right outer radial ribs 44, 45), and the left and right tilted ribs 47, 48.

The left reinforcing rib group 57, which is formed on the underside 24i of the left side rear upper section 24, includes an inner side rib 58, a front side rib 59, a middle side rib 61, a rear side rib 62, a front tilted side rib 63, a middle tilted side rib 64, and a rear tilted side rib 65.

The inner side rib 58 is positioned close to a left end 32a of the rear cross member 32 and extends along the outer wall part 24c of the left side rear upper section 24 (FIG. 4). The front side rib 59, the middle side rib 61, and the rear side rib 62 are positioned on extension lines of the front left parallel rib 52, the middle parallel rib 54, and the rear parallel rib 55, respectively.

The front tilted side rib 63 is positioned substantially on an extension line of the left outer radial rib 44. The rear tilted side rib 65 extends from a left end 55a of the rear parallel rib 55 and an inner end 62a of the rear side rib 62 to an outer end 59a of the front side rib 59 in a direction along the left outer radial rib 44. The middle tilted side rib 64 extends from an inner end 63a of the front tilted side rib 63 to a vicinity of the outer end 59a of the front side rib 59.

Figure 9A:
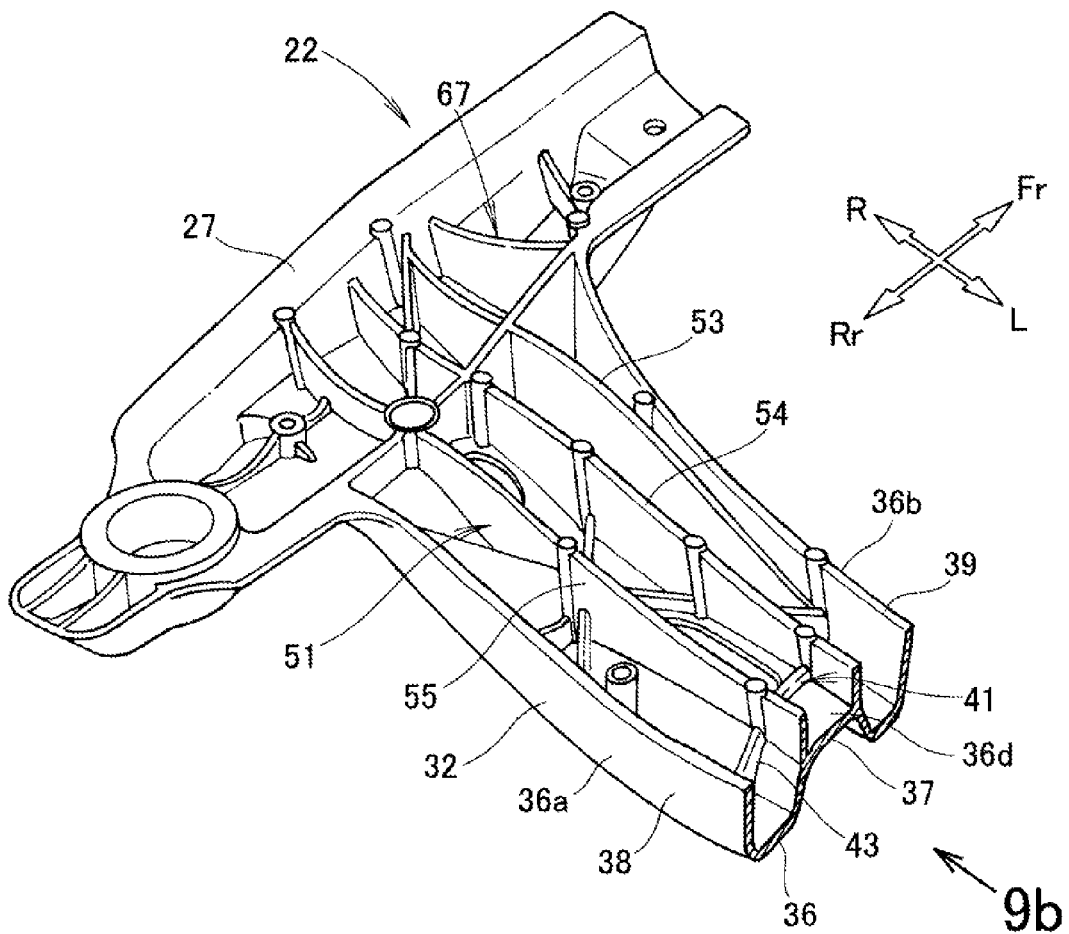
FIG. 9A is a cross-sectional view of the rear subframe of FIG. 7 with a rear cross member cut.
Figure 9B:
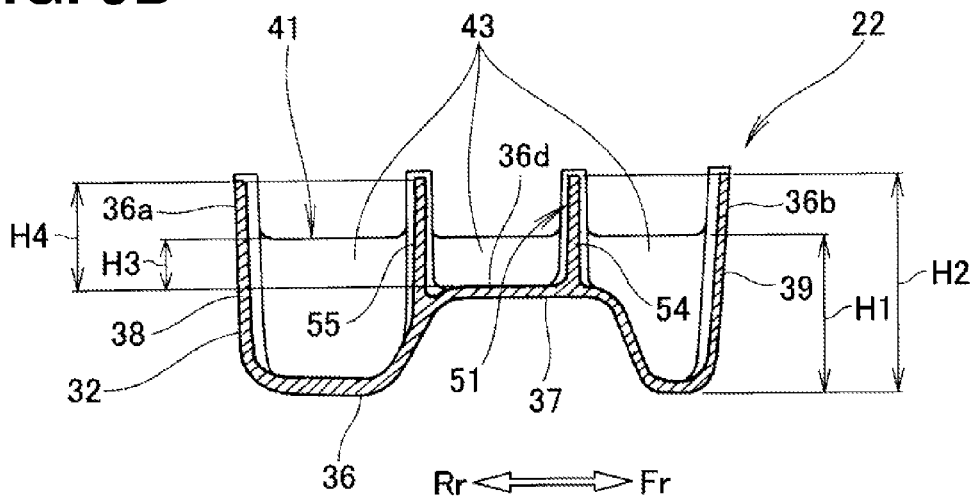
FIG. 9B is a view taken in a direction of arrow 9b of FIG. 9A.
Figure 10:
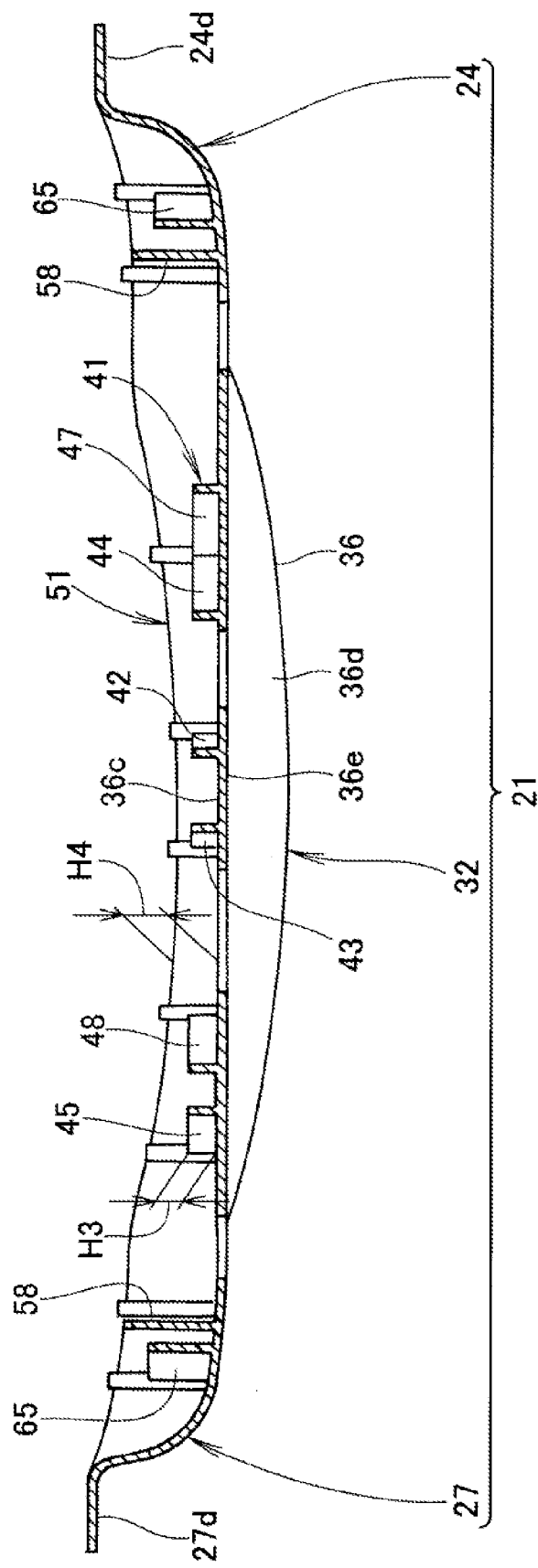
FIG. 10 is a cross-sectional view taken along line 10-10 of FIG. 6.

As shown in FIGS. 9A-9B and 10, the radial rib group 41 has a rib height H1 as the height of the radial ribs 42 to 45. The parallel rib group 51 has a rib height H2 as the height of the parallel ribs 52 to 55. The rib height H1 of the radial rib group 41 is set to be smaller than the rib height H2 of the parallel rib group 51.

As shown in FIGS. 4 and 10, in the state where the subframe 14 (FIG. 1) is mounted on the vehicle 10, the cross-member upper section 36 of the rear cross member 32 is formed in the upwardly curved shape. The cross-member recess 37 of the cross-member upper section 36 is recessed toward the underside 36c of the cross-member upper section 36. The lowest part of the recess 37 forms the part 36e of the central part 36d of the cross-member upper section 36. Further, the radial rib group 41 and the parallel rib group 51 are formed on the underside 36c of the cross-member upper section 36.

With this configuration, the rib height H3 (see also FIG. 9B) of the radial rib group 41 at the central part 36d of the rear cross member 32 (more specifically, cross-member upper section 36) can be made smaller. Further, the rib height H4 (see also FIG. 9B) of the parallel rib group 51 at the central part 36d can be made smaller.

Since the right reinforcing rib group 67 is bilaterally symmetrical with the left reinforcing rib group 57, the same reference characters are used for the shared elements of the left and right reinforcing rib group 57, 67, and a detailed description of the right reinforcing rib group 67 will be omitted.

Figure 11A:
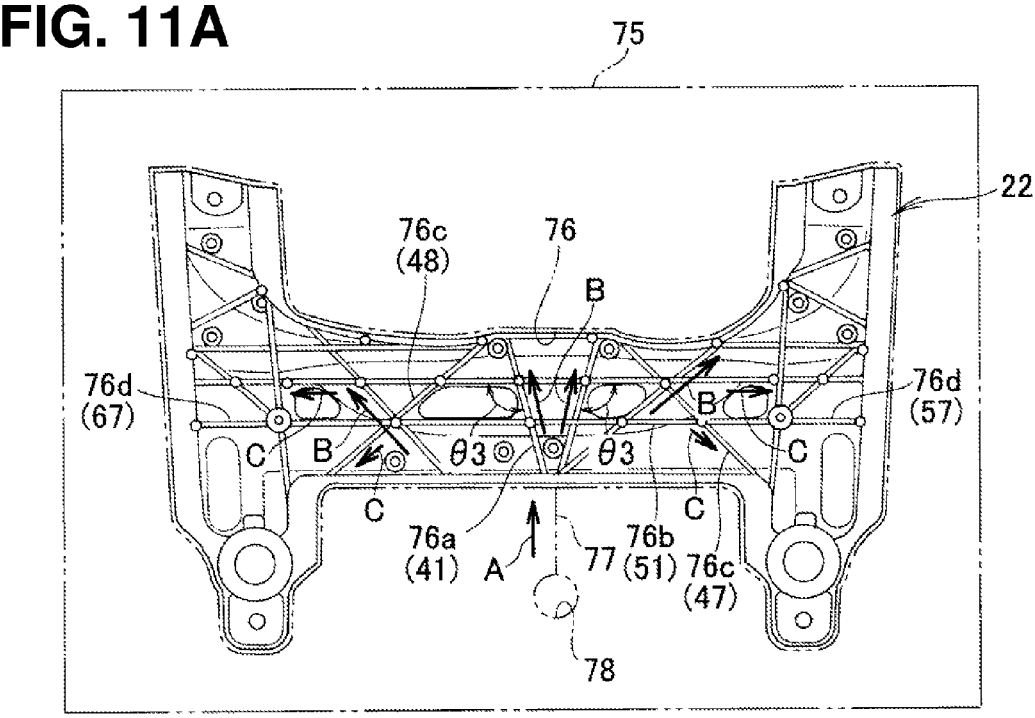
FIG. 11A is a plan view showing how the rear subframe according to the present invention is formed.

Next will be described how the rear subframe 22 of the subframe 14 is formed by low pressure casting of aluminum alloy with reference to FIGS. 11A and 11B. As shown in FIG. 11A, when a casting mold 75 is clumped, a space or cavity 76 for forming the rear subframe 22 is formed inside the mold 75. The cavity 76 includes radial cavities 76a, parallel cavities 76b, left and right tilted cavities 76c, and left and right reinforcing cavities 76d.

In order to facilitate understanding of the configuration, reference characters of the radial cavities 76a, the parallel cavities 76b, the left and right tilted cavities 76c, and the left and right reinforcing cavities 76d are presented together with those of the radial rib group 41, the parallel rib group 51, the left and right tilted ribs 47, 48, and the left and right reinforcing rib groups 57, 67.

The radial cavities 76a are spaces for forming the radial rib group 41. The parallel cavities 76b are spaces for forming the parallel rib group 51. The left and right tilted cavities 76c are spaces for forming the left and right tilted ribs 47, 48. The left and right reinforcing cavities 76d are spaces for forming the left and right reinforcing rib groups 57, 67. The radial cavities 76a, the parallel cavities 76b, the left and right tilted cavities 76c, and the left and right reinforcing cavities 76d can be used as guide passages of molten metal.

The radial cavities 76a have rear ends facing and communicating with a gate 77, and extend radially forward from the rear end of the rear subframe 22. The gate 77 is in communication with a pouring hole 78. The radial cavities 76a are formed to intersect with the parallel cavities 76b. The intersection angles θ3 between the radial cavities 76a and the parallel cavities 76b are set to be obtuse angles. The radial cavities 76a also intersect the left and right tilted cavities 76c. Further, the parallel cavities 76b are formed to intersect with the left and right reinforcing cavities 76d.

In the state where the mold 75 is clumped, molten metal of aluminum alloy is poured from the pouring hole 78, and the molten metal is guided to the gate 77. The molten metal guided to the gate 77 is then guided to the rear ends of the radial cavities 76a (i.e., spaces corresponding to the rear ends 42a to 45a (FIG. 6) of the radial rib group 41 including the radial ribs 42 to 45) as indicated by arrow A. The molten metal guided to the rear ends of the radial cavities 76a can be suitably guided by the radial cavities 76a to flow to all the regions of the cavity 76 as indicated by arrows B.

Further, the molten metal guided to the radial cavities 76a is then guided from the radial cavities 76a to the parallel cavities 76b and the left and right tilted cavities 76c as indicated by arrows C. Since the intersection angles θ3 between the radial cavities 76a and the parallel cavities 76b are set to be obtuse angles, the molten metal can be smoothly guided from the radial cavities 76a to the parallel cavities 76b. In addition, flows of the molten metal guided to the parallel cavities 76b and the left and right tilted cavities 76c are then guided to the left and right reinforcing cavities 76d.

In this manner, it is possible to smoothly guide the molten metal by the radial cavities 76a, the parallel cavities 76b, the tilted cavities 76c, and the left and right reinforcing cavities 76d, thereby maintaining a good flow. As a result, the molten metal can be suitably guided through all the regions of the cavity 76.

The rear subframe 22 is a cast member having a relatively complicated shape, which is formed in the substantially U-shape in a plan view and has the substantially hat-shaped cross section (FIG. 4). It is therefore required to maintain the good flow in order to efficiently form the rear subframe 22 by low pressure casting. According to the rear subframe 22 configured as described above, the molten metal can be suitably guided through all the regions of the cavity 76 even when forming by low pressure casting the rear subframe 22 having such a relatively complicated shape, which leads to shortening of casting process time.

Figure 11B:
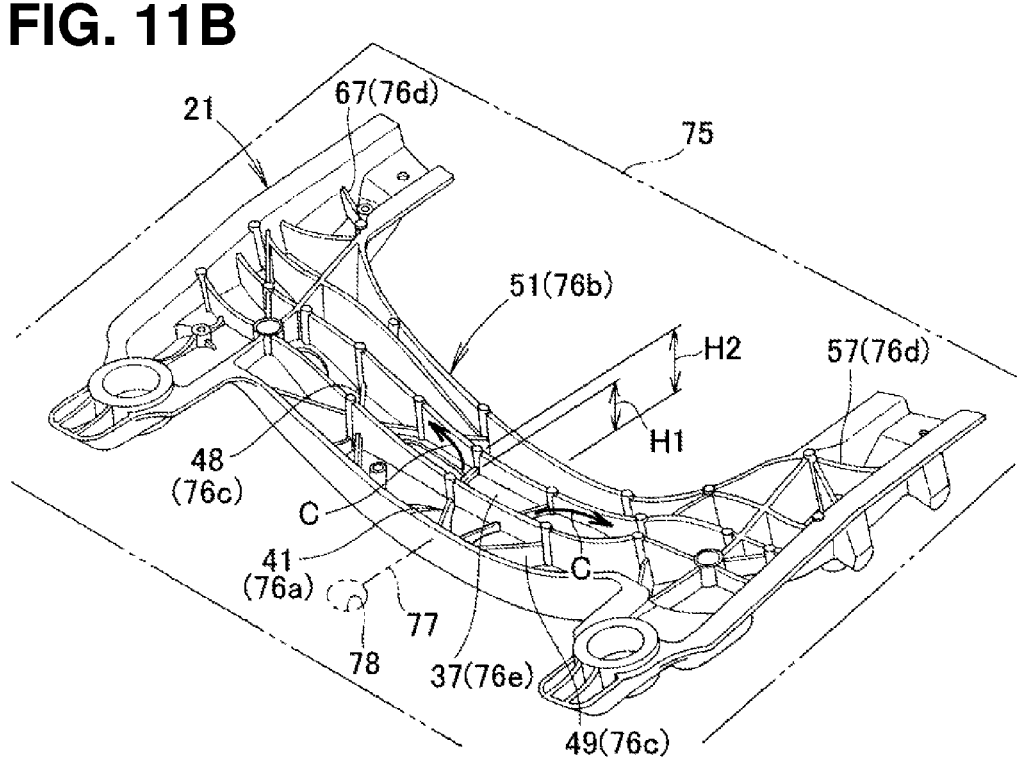
FIG. 11B is a perspective view showing how the rear subframe according to the present invention is formed.

As shown in FIG. 11B, the rib height H1 of the radial rib group 41 is set to be smaller than the rib height H2 of the parallel rib group 51. Therefore, the parallel cavities 76b can be formed larger than the radial cavities 76a, which allows the molten metal guided by the radial cavities 76a to flow smoothly into the parallel cavities 76b as indicated by arrows C.

The molten metal guided to the parallel cavities 76b further flows smoothly outward in the vehicle width direction, thereby maintaining the good flow. As a result, the molten metal can be suitably guided through all the regions of the cavity 76, which leads to further shortening of casting process time for forming the rear subframe 22 by low pressure casting.

Further, as shown in FIGS. 9A-9B, the rib height H3 of the radial rib group 41 and the rib height H4 of the parallel rib group 51 at the central part 36d of the rear cross member 32 are made smaller. As shown in FIG. 11B, when the mold 75 is clumped, a space (recess cavity 76e) for forming the cross-member recess 37 is formed inside the 75 to be in communication with the radial cavities 76a and the parallel cavities 76b. In order to facilitate understanding of the configuration, the reference character of the recess cavity 76e is presented together with that of the cross-member recess 37.

The cavity heights H3 and H4 of the radial cavities 76a and the parallel cavities 76b can be made smaller. With this configuration, it is possible to allow the molten metal guided by the radial cavities 76a and the parallel cavities 76b to flow smoothly into the recess cavity 76e, thereby maintaining the good flow. As a result, the molten metal can be suitably guided through all the regions of the cavity 76, which leads to further shortening of casting process time for forming the rear subframe 22 by low pressure casting.

Note that the vehicle subframe according to the present invention is not limited to the above-described embodiment, and various minor changes and modifications of the present invention are possible in light of the above teaching. For example, the embodiment has been explained in the case where the rear subframe 22 is formed by low pressure casting, however, it is not so limited, and the present invention may be applied to a rear subframe 22 formed by (high pressure) die casting.

Although in the embodiment the vehicle subframe 14 has a rectangular shape, it is not so limited, and the present invention may be applied to a vehicle subframe having a substantially U-shape, I-shape, or any other shape.

Whereas in the embodiment the subframe 14 is constituted of the steel-made front subframe 21 and the aluminum-made rear subframe 22 (cast member), it is not so limited, and the present invention may be applied to a subframe constituted only of an aluminum-made rear subframe (cast member).

Furthermore, the shapes and configurations of the vehicle 10, the subframe 14, the left and right front suspensions 15, 16, the rear subframe 22, the left and right side member 23, 26, the left and right side rear upper sections 24, 27, the rear cross member 32, the cross-member upper section 36, the cross-member recess 37, the radial rib group 41, the left and right outer radial ribs 44, 45, the parallel rib group 51, etc. are not limited to those illustratively shown and described herein, and they may be modified as necessary.

INDUSTRIAL APPLICABILITY

The present invention is well suited for use in passenger vehicles equipped with a vehicle subframe which is composed partly or wholly of a cast member.

REFERENCE CHARACTERS

10 ... vehicle, 14 ... subframe (vehicle subframe), 15, 16 ... left and right front suspensions (suspensions), 22 ... rear subframe, 23 ... left side member 23a ... front end of the left side member, 23b ... rear end of the left side member, 24 ... left side rear upper section (rear section of the left side member), 26 ... right side member, 26a ... front end of the right side member, 26b ... rear end of the right side member, 27 ... right side rear upper section (rear section of the right side member), 32 ... rear cross member (cross member), 36 ... cross-member upper section, 36b ... front end of the cross-member upper section, 36c ... underside of the cross-member upper section, 36d ... central part in a vehicle width direction, 36f ... central rear end (rear end) of the central part, 37 ... cross-member recess, 41 ... radial rib group (a plurality of radial ribs), 44, 45 ... left and right outer radial ribs (left and right radial ribs positioned outward in the vehicle width direction), 51 ... parallel rib group (a plurality of parallel ribs), H1 to H2 ... rib height, θ1, θ2 ... tilt angle

The invention claimed is:

1. A vehicle subframe configured to support left and right suspensions, the vehicle subframe including a left side member disposed on a left side of a vehicle and extending in a longitudinal direction of the vehicle, a right side member disposed on a right side of the vehicle and extending in the longitudinal direction of the vehicle, and a cross member connecting the left and right side members,
wherein the cross member, a rear section of the left side member and a rear section of the right side member are integrally formed of aluminum alloy to have a substantially U-shape in a plan view,
wherein the cross member has:
a plurality of radial ribs extending radially from a rear end of a central part of the cross member in the vehicle width direction to a front end thereof to tilt outward in the vehicle width direction; and
a plurality of parallel ribs intersecting with the radial ribs and extending parallel to the cross member, and
wherein the radial ribs being arranged in such a manner that radial ribs positioned further outward in the vehicle width direction away from the central part of the cross member form larger tilt angles.

2. The vehicle subframe of claim 1, wherein the radial ribs include left and right radial ribs positioned outward in the vehicle width direction and extending toward the left and right suspensions, respectively.

3. The vehicle subframe of claim 2, wherein the radial ribs have a rib height smaller than that of the parallel ribs.

4. The vehicle subframe of claim 2, wherein, in a state where the vehicle subframe is mounted on the vehicle, the cross member includes a cross-member upper section extending between the rear section of the left side member and the rear section of the right side member to form an upwardly curved shape with a central part thereof in the vehicle width direction raised upward, and having the radial ribs and the parallel ribs formed on an underside thereof, and wherein the cross-member upper section has a cross-member recess extending in the vehicle width direction and recessed toward the underside so that a lowest part thereof forms a part of the central part.

5. The vehicle subframe of claim 1, wherein the radial ribs have a rib height smaller than that of the parallel ribs.

6. The vehicle subframe of claim 5, wherein, in a state where the vehicle subframe is mounted on the vehicle, the cross member includes a cross-member upper section extending between the rear section of the left side member and the rear section of the right side member to form an upwardly curved shape with a central part thereof in the vehicle width direction raised upward, and having the radial ribs and the parallel ribs formed on an underside thereof, and wherein the cross-member upper section has a cross-member recess extending in the vehicle width direction and recessed toward the underside so that a lowest part thereof forms a part of the central part.

7. The vehicle subframe of claim 1, wherein, in a state where the vehicle subframe is mounted on the vehicle, the cross member includes a cross-member upper section extending between the rear section of the left side member and the rear section of the right side member to form an upwardly curved shape with a central part thereof in the vehicle width direction raised upward, and having the radial ribs and the parallel ribs formed on an underside thereof, and wherein the cross-member upper section has a cross-member recess extending in the vehicle width direction and recessed toward the underside so that a lowest part thereof forms a part of the central part.

* * * * *